United States Patent
Park et al.

(10) Patent No.: US 8,443,203 B2
(45) Date of Patent: May 14, 2013

(54) SECURE BOOT METHOD AND SEMICONDUCTOR MEMORY SYSTEM USING THE METHOD

(75) Inventors: Dong-Jin Park, Seoul (KR); Hyo-Sun Hwang, Bucheon-si (KR); Myung-Hee Kang, Seoul (KR); Won-Il Lee, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 1359 days.

(21) Appl. No.: 12/145,102

(22) Filed: Jun. 24, 2008

(65) Prior Publication Data

US 2009/0019275 A1    Jan. 15, 2009

(30) Foreign Application Priority Data

Jul. 13, 2007    (KR) .................. 10-2007-0070778

(51) Int. Cl.
*G06F 21/00*    (2006.01)

(52) U.S. Cl.
USPC .......................................................... 713/187

(58) Field of Classification Search .................. None
See application file for complete search history.

(56) References Cited

U.S. PATENT DOCUMENTS

| 5,999,629 | A | 12/1999 | Heer et al. | |
| 8,239,686 | B1* | 8/2012 | Hodzic et al. | 713/187 |
| 2003/0088784 | A1* | 5/2003 | Ginter et al. | 713/189 |
| 2004/0025010 | A1* | 2/2004 | Azema et al. | 713/156 |
| 2004/0025027 | A1* | 2/2004 | Balard et al. | 713/183 |
| 2004/0054907 | A1* | 3/2004 | Chateau et al. | 713/175 |
| 2005/0079868 | A1* | 4/2005 | Shankar et al. | 455/435.1 |
| 2006/0101310 | A1* | 5/2006 | Diamant et al. | 714/38 |
| 2008/0148001 | A1* | 6/2008 | Gehrmann et al. | 711/164 |

FOREIGN PATENT DOCUMENTS

| KR | 1020030002932 | 1/2003 |
| KR | 1020040073502 | 8/2004 |

OTHER PUBLICATIONS

English Abstract for Publication No. 1020030002932.
English Abstract for Publication No. 1020040073502.

* cited by examiner

*Primary Examiner* — Gilberto Barron, Jr.
*Assistant Examiner* — Shaun Gregory
(74) *Attorney, Agent, or Firm* — F. Chau & Associates, LLC

(57) ABSTRACT

A semiconductor memory system includes an external memory, an internal memory, and a one-time programmable (OTP) memory. The external memory includes a kernel, a public key, first boot information used to authenticate the public key and generate a test secret key, and a second boot loader verifying integrity of the kernel. The internal memory includes a first boot loader that verifies integrity of the second boot loader and generates the test secret key. The OTP memory includes second boot information generated using the public key and a secret key. Since the secure boot method and the semiconductor memory system using the method do not need an additional OTP memory to store a secret key unlike conventional technology, the capacity and recording time of the OTP memory can be reduced to about half compared to the conventional technology.

30 Claims, 6 Drawing Sheets

SECURE BOOT METHOD AND SEMICONDUCTOR MEMORY SYSTEM USING THE METHOD

CROSS-REFERENCE TO RELATED PATENT APPLICATIONS

This application claims priority to Korean Patent Application No. 10-2007-0070778, filed on Jul. 13, 2007, in the Korean Intellectual Property Office, the disclosure of which is incorporated herein in its entirety by reference.

BACKGROUND OF THE INVENTION

1. Technical Field

The present invention relates to a semiconductor memory system, and more particularly, to a secure boot method and a semiconductor memory system using the method.

2. Discussion of the Related Art

Many electronic apparatuses perform a boot process to ensure normal operation. During the boot process, the electronic apparatus is appropriately initialized and loads a program to a main memory. The boot process determines the initial state of the electronic apparatus and affects major operational parameters. Also, the boot process may substantially affect how the electronic apparatus functions. Because of the significance of the boot process, it may be desirable to prevent users from tampering with the boot process to ensure that the electronic apparatus functions normally and in an intended manner. Moreover, many electronic apparatuses execute software in a secure environment and thus it is desirable to protect the boot process from modification so as to maintain the security of the environment.

For example, makers of high priced home game consoles may sell hardware itself at a low price and pursue profit through the sales of software. The hardware may then authenticate the software prior to execution to prevent the execution of unauthorized copies of software and/or arbitrary code. If a user is able to easily change the boot process to execute unauthorized copies of software and/or arbitrary code in the game console, the makers may loose profits.

Accordingly, makers selling electronic apparatuses desire a secure boot method that is versatile enough to execute a desired boot process and yet cannot be easily changed.

Also, manufacturers of electronic apparatuses or service providers using the electronic apparatuses may desire to keep a secret key safe in the electronic apparatus. The secret key can be used for a variety of purposes. For example, the secret key can be used to encrypt, at least in part, a kernel or establish a secure communication channel between the electronic apparatus and the manufacturers or service providers. In order to keep the secret key safe, a secure storage space is generally provided inside the electronic apparatus. A one-time programmable (OTP) memory in a system on chip (SoC) has been used to keep the secret key safe within electronic apparatuses.

The OTP memory can be used to keep the secret key safe when the secure boot method is used. Generally, the cell size of the OTP memory is larger than that of common memory. Thus, use of OTP memory may cause an increase in manufacturing costs. Also, because the OTP memory may take longer to record to than conventional memory, manufacturing of electronic apparatus utilizing OTP memory may take longer than for conventional devices and thus fewer units of the electronic apparatus may be produced in a given period of time.

SUMMARY OF THE INVENTION

Exemplary embodiments of the present invention provide semiconductor memory systems for reducing the capacity and recording time of a one-time programmable (OTP) memory.

Exemplary embodiments of the present invention provide secure boot methods for the semiconductor memory system.

According to an aspect of the present invention, a semiconductor memory system includes an external memory, an internal memory, and an OTP memory. The external memory includes a kernel, a public key, a first boot information used to authenticate the public key and generate a test secret key, and a second boot loader verifying integrity of the kernel. The internal memory includes a first boot loader that verifies integrity of the second boot loader and generates the test secret key. The OTP memory includes a second boot information generated by using the public key and a secret key.

The first boot loader generates the test secret key by using the first boot information of the external memory and the second boot information of the OTP memory.

According to another aspect of the present invention, a semiconductor memory system includes an external memory, an internal memory, and an OTP memory. The external memory includes a kernel, a public key, a message authentication code generated by using the public key and a secret key, and a second boot loader verifying integrity of the kernel. The internal memory includes a first boot loader that verifies integrity of the second boot loader. The OTP memory includes boot information that is generated by using the message authentication code and the secret key.

The first boot loader generates a test message authentication code by using the test secret key and the public key and controls the semiconductor memory system to terminate a boot process when the test message authentication code and the message authentication code stored in the external memory are not the same.

The first boot loader generates a test message authentication code by using the test secret key and the public key and controls the semiconductor memory system to continue a boot process when the test message authentication code and the message authentication code stored in the external memory are the same.

The boot information is obtained by performing an XOR operation on the message authentication code and the secret key in units of bits.

According to another aspect of the present invention, a semiconductor memory system includes an external memory, an internal memory, and an OTP memory. The external memory includes a kernel, a public key, a secret key hash value generated by using a secret key, and a second boot loader verifying integrity of the kernel. The internal memory includes a first boot loader that verifies integrity of the second boot loader. The OTP memory includes boot information that is generated by using the public key and the secret key.

The first boot loader generates a test secret key by using the boot information of the OTP memory and the secret key hash value of the external memory.

The first boot loader generates a test hash value by using the test secret key and controls the semiconductor memory system to terminate a boot process when the test hash value and the secret key hash value stored in the external memory are not the same.

The first boot loader generates a test hash value by using the test secret key and controls the semiconductor memory system to continue a boot process when the test hash value and the secret key hash value stored in the external memory are the same.

The secret key hash value is a value obtained by hashing the secret key. The boot information is obtained by performing an XOR operation on the secret key and a value obtained by hashing a value obtained by concatenating the public key and the secret key hash value, in units of bits.

According to another aspect of the present invention, a secure boot method of a semiconductor memory system including a public key, a message authentication code generated by using the public key and a secret key, and boot information generated by using the message authentication code and the secret key. The method includes generating a test secret key by using the boot information and the message authentication code. A test message authentication code is generated by using the test secret key and the public key. The test message authentication code and the message authentication code are compared. A boot process is terminated when the test message authentication code and the message authentication code are not the same according to a result of the comparison. The boot process is continued when the test message authentication code and the message authentication code are the same according to a result of the comparison.

In generating the test secret value, an XOR operation is performed on the boot information and the message authentication code.

According to anther aspect of the present invention, a secure boot method of a semiconductor memory system including a public key, a hash value generated by using a secret key, and boot information generated by using the public key and the secret key. The method includes generating a test secret key by using the secret key hash value and the boot information. A test hash value is generated by using the test secret key. The test hash value and the secret key hash value are compared. A boot process is terminated when the test hash value and the secret key hash value are not the same according to a result of the comparison. The boot process is continued when the test hash value and the secret key hash value are the same according to the result of the comparison.

The generating of the test secret key includes concatenating the public key and the secret key hash value, hashing the value obtained through the concatenation, and generating the test secret key by performing an XOR operation on a value obtained by hashing the value obtained through the concatenation and the boot information.

In generating the test hash value, the test secret key is hashed.

BRIEF DESCRIPTION OF THE DRAWINGS

The above and other features and aspects of the exemplary embodiments of the present invention will be described in detail with reference to the attached drawings in which.

DETAILED DESCRIPTION OF EXEMPLARY EMBODIMENTS

Figure 1:
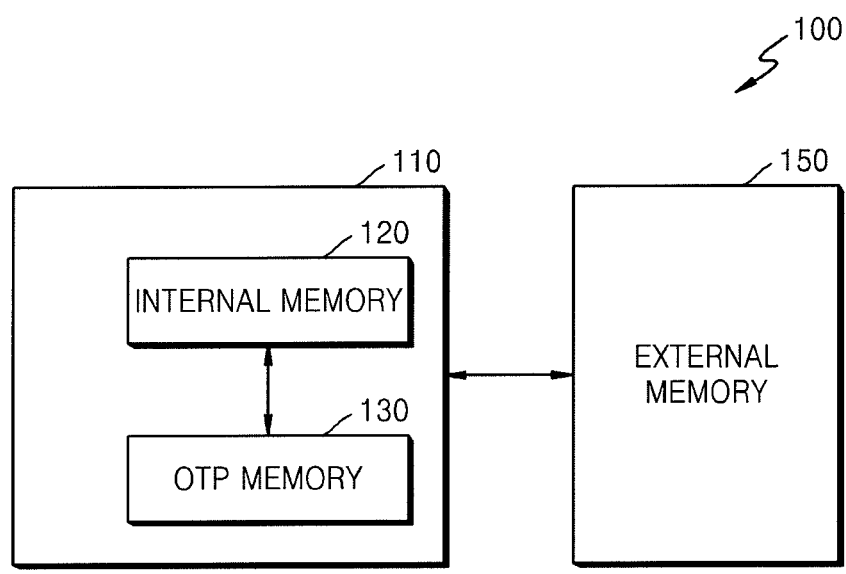
FIG. 1 is a block diagram of a semiconductor memory system according to an exemplary embodiment of the present invention.

Hereinafter, exemplary embodiments of the invention are described in detail with reference to the attached drawings. Like reference numerals in the drawings may denote like elements.

FIG. 1 is a block diagram of a semiconductor memory system 100 according to an exemplary embodiment of the present invention. Referring to FIG. 1, the semiconductor memory system 100 includes an internal memory 120, a one-time programmable (OTP) memory 130, and an external memory 150. The internal memory 120 and the OTP memory 130 can be implemented in a system on chip (SoC) 110.

The external memory 150 includes a kernel, a public key, first boot information used to approve the public key and generate a test secret key, and a second boot loader (SBL) for verifying integrity of the kernel. The internal memory 120 includes a first boot loader (FBL) that verifies integrity of the SBL and generates the test secret key. The OTP memory 130 includes second boot information generated using the public key and a secret device key (SDK). The FBL generates the test secret key by using the first boot information of the external memory 150 and the second boot information of the OTP memory 130.

Several approaches are described herein for providing a secure boot method by using the internal memory 120, the OTP memory 130, and the external memory 150.

Figure 2:
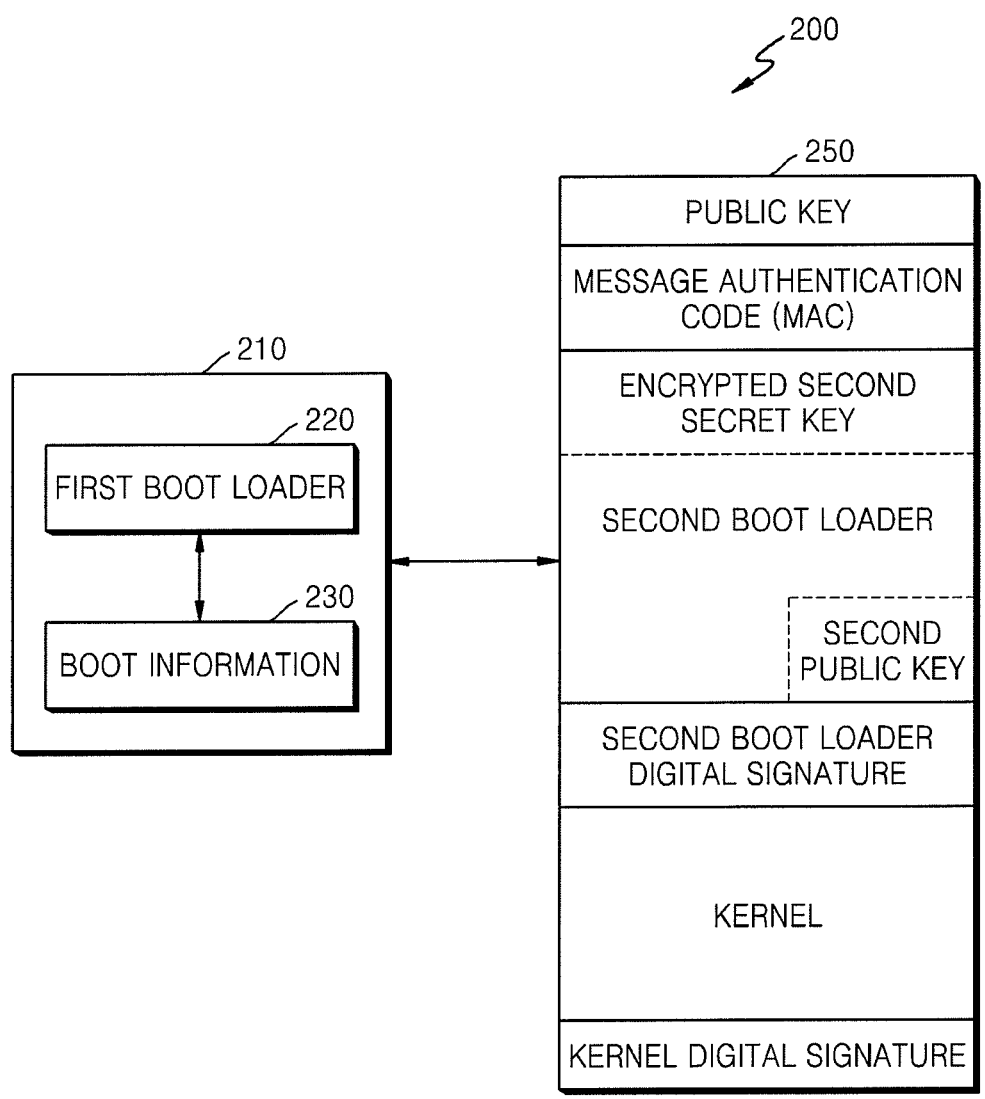
FIG. 2 is a block diagram of a semiconductor memory system according to an exemplary embodiment of the present invention.

FIG. 2 is a block diagram of a semiconductor memory system 200 according to an exemplary embodiment of the present invention. Referring to FIG. 2, the semiconductor memory system 200 includes an internal memory 220, an OTP memory 230, and an external memory 250. The external memory 250 includes a public key, first boot information, an SBL, an SBL digital signature, a kernel, and a kernel digital signature.

The SBL digital signature is a digital signature value of the SBL while the kernel digital signature is a digital signature value of the kernel. The SBL verifies the integrity of the kernel. The SBL verifies the integrity of the kernel through the verification of the kernel digital signature by using the public key. When a second public key exists, the SBL verifies the integrity of the kernel through the verification of the kernel digital signature by using the second public key.

At least a part of the kernel, for example, the entire kernel, can be encrypted by the SDK. Also, at least a part of the kernel, for example, the entire kernel, can be encrypted by a second SDK SDK_2 that is encrypted by the SDK.

The first boot information signifies a message authentication code (MAC). The MAC can be generated using the public key and the SDK. The MAC is added to data to verify whether the data has been modified, for example, corrected, deleted, or inserted. A function for generating the MAC includes a keyed-hash MAC HMAC using a hash function and a CBC (cipher block chaining) MAC CBC_MAC of a block code. There are many other functions for generating the MAC. The MAC may be generated using other techniques known in the art. A key is used to generate and verify the MAC. In the following description, the MAC is a code generated using the public key as an input and the SDK as the key according to the following expression: MAC (SDK, Public Key). However, other values may be used as the input and key of the MAC.

The OTP memory 230 includes second boot information that is generated using the MAC and the SDK. The second boot information is, for example, information obtained by performing an exclusive OR (XOR) operation on the MAC and the SDK in units of bits, and is expressed by MAC(SDK, Public Key)⊕SDK. Since the MAC performs the XOR operation in units of bits with the SDK, the bit number of the MAC is preferably the same as that of the SDK.

The internal memory 220 includes an FBL that verifies the integrity of the SBL. The FBL verifies the integrity of the kernel through the authentication of the kernel digital signature by using the public key. The internal memory 220 may be a read only memory (ROM). The operation of the FBL is described in detail with reference to FIG. 3.

Figure 3:
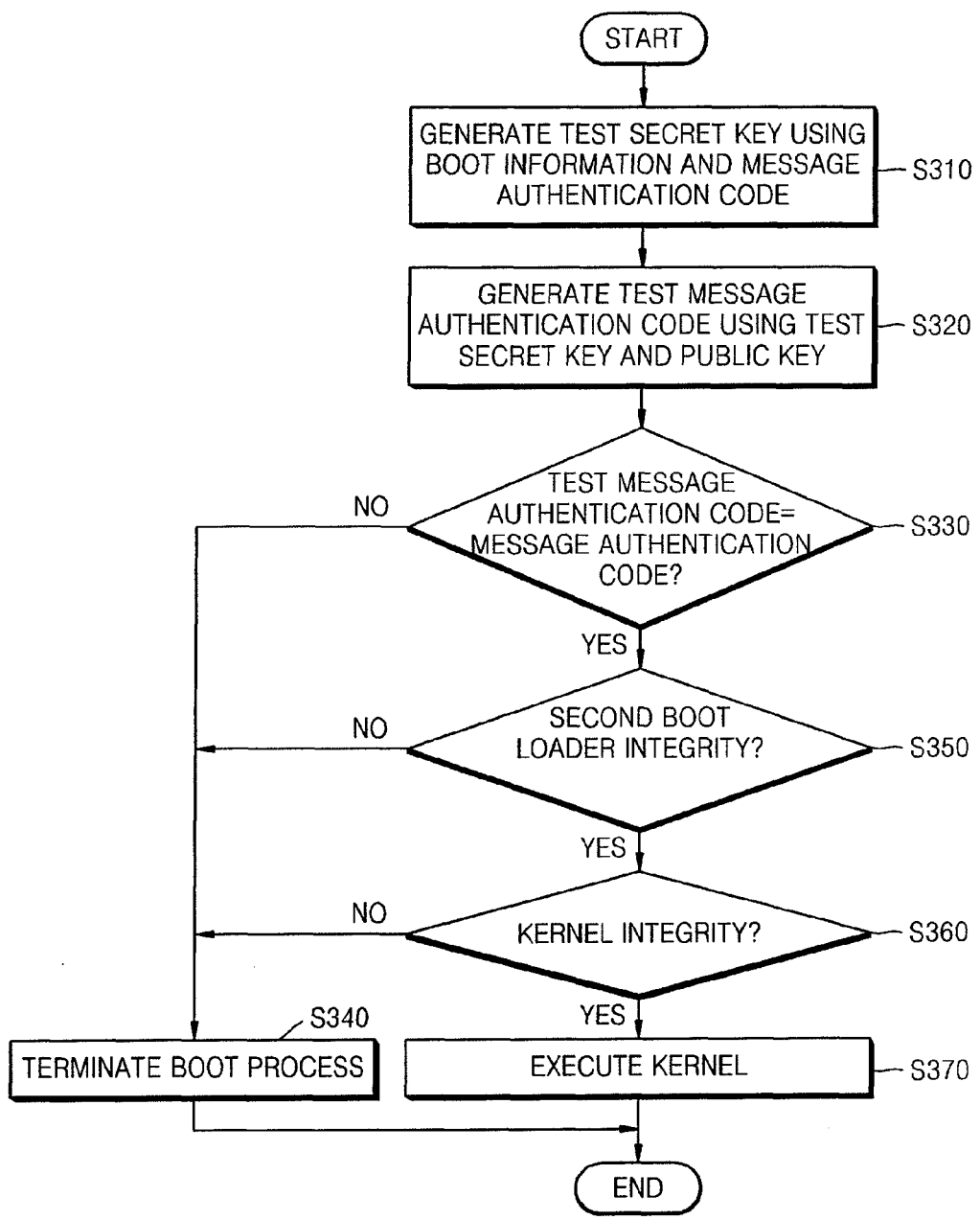
FIG. 3 is a flowchart illustrating a secure boot method of the semiconductor memory system of FIG. 2.

FIG. 3 is a flowchart illustrating a secure boot method of the semiconductor memory system 200 of FIG. 2. Referring to FIGS. 2 and 3, the FBL generates a test secret key SDK_T using the second boot information stored in the OTP memory 230 and the MAC stored in the external memory 250 (S310). The FBL performs the XOR operation on the second boot information and the MAC in units of bits. The SDK_T can be expressed by Equation 1 when the value stored in the external memory 250 is not changed.

$$SDK\_T=[MAC(SDK, Public\ Key)\oplus SDK]\oplus MAC(SDK, Public\ Key) \quad [Equation\ 1]$$

The FBL generates a test message authentication code (MAC_T) by using the SDK_T and the public key stored in the external memory 250 (S320). The FBL generates the MAC_T by using the SDK_T as a key and the public key as an input. The MAC_T can be expressed by Equation 2.

$$MAC\_T=MAC(SDK\_T, Public\ Key) \quad [Equation\ 2]$$

The FBL compares whether the MAC_T and the MAC stored in the external memory 250 are the same (S330). When the MAC_T and the MAC are not the same (no, S330), the SDK_T is determined not to be the same as the SDK. Thus, the FBL controls the semiconductor memory system 200 to terminate a boot process that is currently executing (S340).

When the MAC_T and the MAC are the same (yes, S330), the SDK_T is determined to be the same as the SDK. Thus, the FBL controls the semiconductor memory system 200 to continue the currently executing boot process. When the MAC_T and the MAC are the same (yes, S330), the FBL verifies the integrity of the SBL through the verification of the SBL digital signature by using the public key (S350). When the verification of the SBL fails (no, S350), the currently executing boot process is terminated (S340).

When the verification of the SBL is successful (yes, S350), the SBL verifies the integrity of the kernel through the verification of the kernel digital signature by using the publication key (S360). When the verification of the kernel fails (no, S360), the currently executing boot process is terminated (S340). When the verification of the kernel is successful (yes, S360), the kernel is executed (S370).

When a part or the entire region of the kernel is encrypted by SDK, the part or the entire region of the kernel is decoded using the SDK when the kernel is executed. In this case, since it is known that the SDK_T generated by the FBL is the same as the SDK, the SDK_T is used. When the part or the entire region of the kernel is encrypted by the SDK_2, the part or the entire region of the kernel is decoded using the SDK_2 when the kernel is executed. In this case, since the SDK_T generated by the FBL is the same as the SDK and the SDK_2 is encrypted by the SDK, the SDK_2 that is decoded using the SDK_T is used.

The external memory 250 further includes the second public key used for the verification of the integrity of the kernel. In this case, the SBL verifies the integrity of the kernel through the verification of the kernel digital signature by using the SDK_2 (S360). When the verification of the kernel fails (no, S360), the currently executing boot process is terminated (S340). When the verification of the kernel is successful (yes, S360), the kernel is executed (S370).

Figure 4:
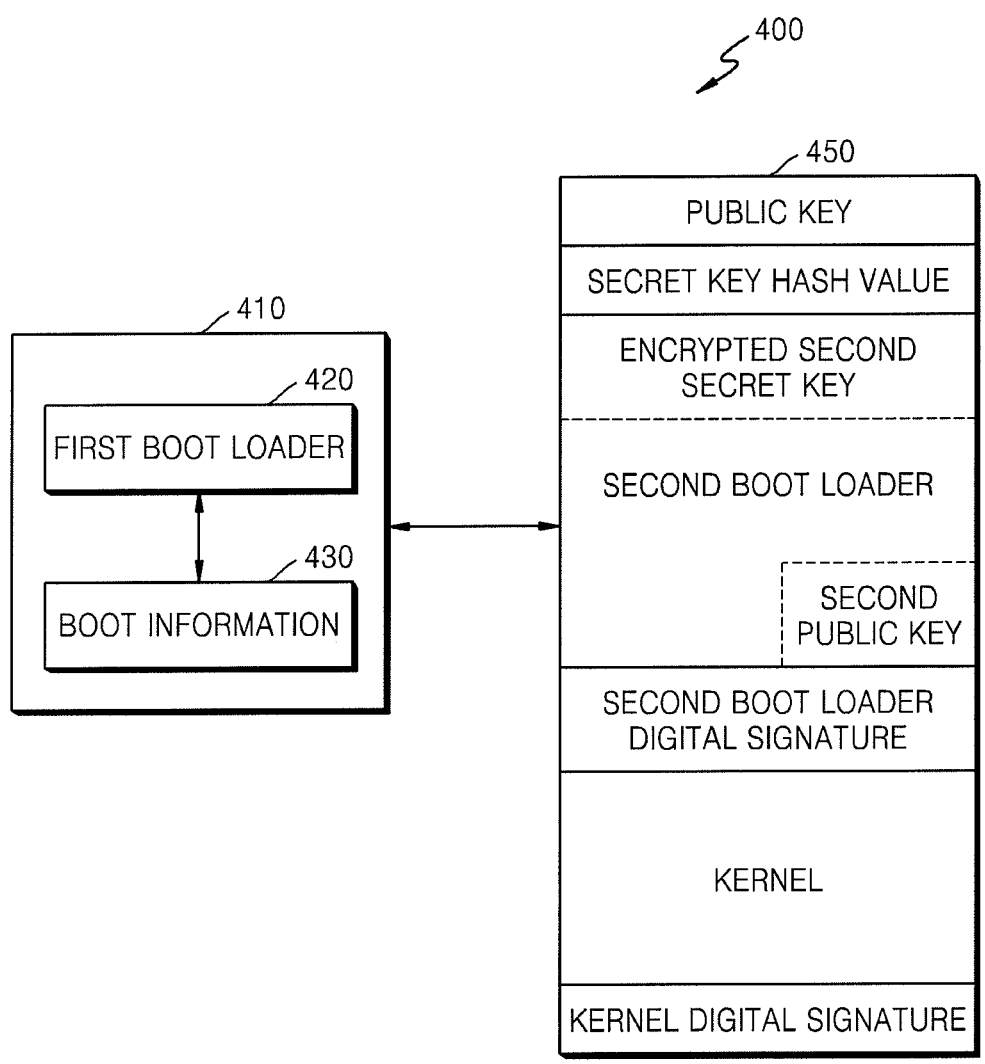
FIG. 4 is a block diagram of a semiconductor memory system according to an exemplary embodiment of the present invention.

FIG. 4 is a block diagram of a semiconductor memory system 400 according to an exemplary embodiment of the present invention. Referring to FIG. 4, the semiconductor memory system 400 includes an internal memory 420, an OTP memory 430, and an external memory 450. The external memory 450 includes a public key, first boot information, an SBL, an SBL digital signature, a kernel, and a kernel digital signature.

The first boot information signifies an SDK hash value that is generated using the SDK. In comparison to the external memory 250 of FIG. 2, the external memory 450 includes the same information except that the first boot information of the external memory 450 includes the SDK hash value instead of the MAC. Thus, only the SDK hash value is described as the description of the other information may be the same as discussed above. The SDK hash value is, for example, a value obtained by hashing the SDK and expressed by h(SDK). The term "hash" pertains to a method for representing data as a text string by performing a hash function on the data ("hashing"). The data may then be easily recognized by the text string ("hash value").

The OTP memory 430 includes second boot information generated using the public key and the SDK. The second boot information is, for example, a value obtained by performing an XOR operation on the SDK and a hash value. The hash value is a hash of a value obtained by concatenating the public key and the SDK hash value, in units of bits. The second boot information is expressed by h[Public Key||h(SDK)]⊕SDK. Accordingly, the number of bits of the value obtained by hashing the value obtained by concatenating the public key and SDK hash value is the same as the number of bits of the SDK.

The particulars concerning the inner memory 420 and the FBL included therein are similar to the inner memory 220 discussed above with respect to FIG. 2. The operation of the FBL is described in detail below with reference to FIG. 5.

Figure 5:
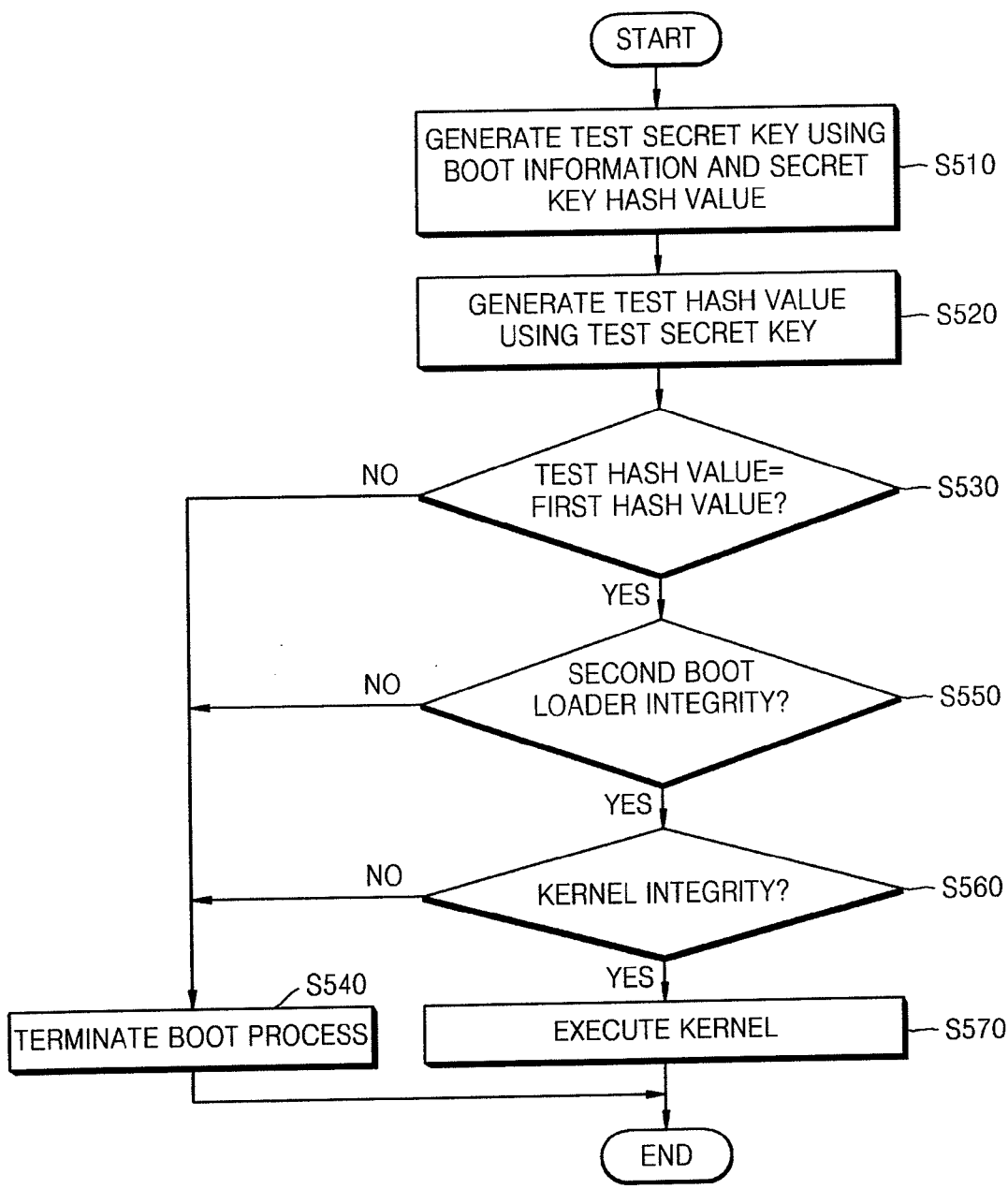
FIG. 5 is a flowchart illustrating a secure boot method of the semiconductor memory system of FIG. 4.

FIG. 5 is a flowchart illustrating a secure boot method of the semiconductor memory system 400 of FIG. 4. Referring to FIGS. 4 and 5, the FBL generates the SDK_T using the second boot information stored in the OTP memory 430 and the SDK hash value stored in the external memory 450 (S510). The FBL performs an XOR operation on the value obtained by hashing the value obtained by concatenating the public key and SDK hash value and the second boot information in units of bits. The SDK_T can be expressed by Equation 3.

$$SDK\_T=h[Public\ Key||h(SDK)]\oplus \{h[Public\ Key||h(SDK)]\oplus SDK\} \quad [Equation\ 3]$$

The FBL generates a test hash value Hash_T by using the SDK_T (S520). The FBL generates the Hash_T by analyzing the SDK_T. The Hash_T can be expressed by Equation 4.

$$Hash\_T=h(SDK\_T) \quad [Equation\ 4]$$

The FBL compares whether the Hash_T and the SDK hash value stored in the external memory 450 are the same (S530). When the Hash_T and the SDK hash value are not the same (no, S530), the SDK_T is determined not to be the same as the SDK. Thus, the FBL controls the semiconductor memory system 500 to terminate the currently executing boot process (S540).

When the Hash_T and the SDK hash value are the same (yes, S530), the SDK_T is determined to be the same as the SDK so that the FBL controls the semiconductor memory system 500 to continue the currently executing boot process. When the Hash_T and the SDK hash value are the same (yes, S530), the FBL verifies the integrity of the SBL through the verification of the SBL digital signature by using the public key (S550). The details of operations S550 to S570 are similar to the operations S350 to S370 described above with reference to FIG. 3.

Figure 6A:
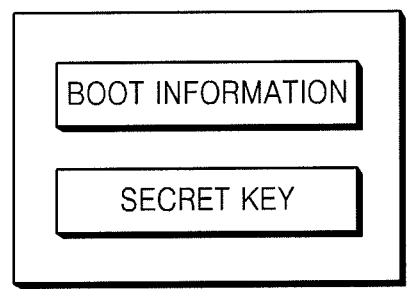
FIG. 6A illustrates a conventional one-time programmable (OTP) memory.
Figure 6B:
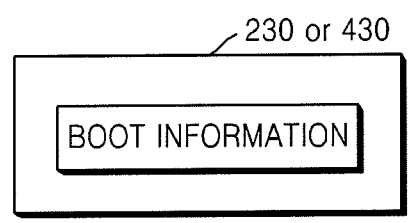
FIG. 6B illustrates the OTP memory of the semiconductor memory system of FIG. 2 or 4.

FIG. 6A illustrates a conventional OTP memory. FIG. 6B illustrates the OTP memory 230 or 430 of the semiconductor memory system 200 or 400 of FIG. 2 or 4. Referring to FIGS. 6A and 6B, the OTP memory 230 or 430 stores the second boot information and also the SDK and performs secure boot using the second boot information and the OTP memory discussed above. However, according to the exemplary embodiments shown in FIGS. 2 and 3 and FIGS. 4 and 5, the OTP memory 230 or 430 stores the second boot information. This is because the semiconductor memory system 200 or 400 of the present disclosure can generate the SDK using the second boot information stored in the OTP memory 230 or 430 and the MAC stored in the external memory 250 or 450.

To safely perform the secure boot method of the present disclosure, the SDK is not known to general application programs. This may be achieved, for example, by configuring hardware to prevent the general application program from accessing the SDK. The hardware normally limits access to the OTP memory and allows access to the OTP memory only during the boot process. Another approach for preventing the general application programs from accessing the SDK is to protect the OTP memory and the SDK using software. A virtual address system is set in the kernel to prevent the application program from directly accessing the OTP memory so that the kernel prevents the application program from accessing the OTP memory.

As described above, according to the secure boot method and the semiconductor memory system using the methods discussed herein, an additional OTP memory is not needed to store the SDK so that the capacity and recording time of the OTP memory can be reduced to about half compared to the conventional technology.

While exemplary embodiments of the present invention have been particularly shown and described with reference to the drawings, it will be understood by those of ordinary skill in the art that various changes in form and details may be made therein without departing from the spirit and scope of the invention.

What is claimed is:

1. A semiconductor memory system comprising:
an external memory including a kernel, a public key, first boot information used to authenticate the public key and generate a test secret key, and a second boot loader verifying integrity of the kernel;
an internal memory including a first boot loader; and
an OTP (one-time programmable) memory including second boot information generated using the public key and a secret key,
wherein the first boot loader generates the test secret key by using the first boot information of the external memory and the second boot information of the OTP memory, generates a test first boot information by using the test secret key, and verifies integrity of the second boot loader by comparing the test first boot information and the first boot information.

2. The semiconductor memory system of claim 1, wherein the first boot loader generates the test secret key by using the first boot information of the external memory and the second boot information of the OTP memory.

3. A semiconductor memory system comprising:
an external memory including a kernel, a public key, first boot information used to authenticate the public key and generate a test secret key, and a second boot loader verifying integrity of the kernel;
an internal memory including a first boot loader that verifies integrity of the second boot loader and generates the test secret key; and
an OTP (one-time programmable) memory including second boot information generated using the public key and a secret key,
wherein the first boot information is a message authentication code that is generated using the public key and the secret key and the second boot information is obtained by performing an XOR operation in units of bits on the secret key and the message authentication code that is generated using the public key and the secret key.

4. The semiconductor memory system of claim 3, wherein the first boot loader generates the test secret key by performing an XOR operation on the second boot information of the OTP memory and the message authentication code of the external memory.

5. The semiconductor memory system of claim 4, wherein the first boot loader generates a test message authentication code by using the test secret key and the public key and controls the semiconductor memory system to terminate a boot process when the test message authentication code and the message authentication code stored in the external memory are not equal.

6. The semiconductor memory system of claim 4, wherein the first boot loader generates a test message authentication code by using the test secret key and the public key and controls the semiconductor memory system to continue a boot process when the test message authentication code and the message authentication code stored in the external memory are equal.

7. A semiconductor memory system comprising:
an external memory including a kernel, a public key, first boot information used to authenticate the public key and generate a test secret key, and a second boot loader verifying integrity of the kernel;
an internal memory including a first boot loader that verifies integrity of the second boot loader and generates the test secret key; and
an OTP (one-time programmable) memory including second boot information generated using the public key and a secret key,
wherein the first boot information is obtained by hashing the secret key and the second boot information is obtained by performing an XOR operation on the secret key and a first hash value, wherein the first hash value is obtained by hashing a value obtained by concatenating the public key and the first boot information, in units of bits.

8. The semiconductor memory system of claim 7, wherein the first boot loader generates the test secret key by performing an XOR operation on the value obtained by hashing a second hash value, wherein the second hash value is obtained by concatenating the public key and the first boot information and the second boot information of the OTP memory.

9. The semiconductor memory system of claim 8, wherein the first boot loader generates a test hash value by hashing the test secret key and controls the semiconductor memory system to terminate a boot process when the test hash value and the first boot information stored in the external memory are not equal.

10. The semiconductor memory system of claim 8, wherein the first boot loader generates a test hash value by hashing the test secret key and controls the semiconductor memory system to continue a boot process when the test hash value and the first boot information stored in the external memory are equal.

11. The semiconductor memory system of claim 1, wherein the external memory includes a second boot loader digital signature and the first boot loader verifies integrity of the second boot loader through the verification of the second boot loader digital signature by using the public key.

12. The semiconductor memory system of claim 1, wherein the external memory includes a kernel digital signature and the second boot loader verifies integrity of the kernel through the verification of the kernel digital signature using the public key.

13. A secure boot method of a semiconductor memory system including a public key, a message authentication code generated using the public key and a secret key, and boot information generated using the message authentication code and the secret key, the method comprising:
   generating a test secret key by using the boot information and the message authentication code;
   generating a test message authentication code by using the test secret key and the public key;
   comparing the test message authentication code and the message authentication code;
   terminating a boot process when the test message authentication code and the message authentication code are not equal according to a result of the comparison; and
   continuing the boot process when the test message authentication code and the message authentication code are equal according to a result of the comparison.

14. The method of claim 13, wherein the boot information is obtained by performing an XOR operation on the message authentication code and the secret key in units of bits and, in the generating of the test secret key, the test secret key is generated by performing an XOR operation on the boot information and the message authentication code.

15. The method of claim 13, wherein the semiconductor system further comprises a kernel, a kernel digital signature that is a digital signature value of the kernel, a second boot loader verifying integrity of the kernel, a second boot loader digital signature that is a digital signature value of the second boot loader, and a first boot loader verifying integrity of the second boot loader.

16. The method of claim 15, wherein the continuing of the boot process comprises:
   verifying the integrity of the second boot loader through the verification of the second boot loader digital signature by using the public key;
   terminating the boot process when the verification of the second boot loader fails; and
   continuing the boot process when the verification of the second boot loader is successful.

17. The method of claim 16, wherein the continuing of the boot process when the verification of the second boot loader is successful comprises:
   verifying the integrity of the kernel through the verification of the kernel digital signature by using the public key;
   terminating the boot process when the verification of the kernel fails; and
   executing the kernel when the verification of the kernel is successful.

18. The method of claim 17, wherein the executing of the kernel comprises decoding at least a part of the kernel by using the secret key when the at least part of the kernel is encrypted using the secret key.

19. The method of claim 17, wherein the executing of the kernel comprises:
   generating a second secret key by using the secret key when at least a part of the kernel is encrypted using the second secret key; and
   decoding the at least part or the overall region of the kernel by using the second secret key.

20. The method of claim 17, wherein the continuing of the boot process when the verification of the second boot loader is successful comprises:
   verifying the integrity of the kernel through the verification of the kernel digital signature using the second public key when the semiconductor memory system further comprises a second public key used for the verification of the integrity of the kernel; terminating the boot process when the verification of the kernel fails; and
   executing the kernel when the verification of the kernel is successful.

21. A secure boot method of a semiconductor memory system including a public key, a hash value generated using a secret key, and boot information generated using the public key and the secret key, the method comprising:
   generating a test secret key by using the secret key hash value and the boot information;
   generating a test hash value by using the test secret key;
   comparing the test hash value and the secret key hash value;
   terminating a boot process when the test hash value and the secret key hash value are not equal according to a result of the comparison; and
   continuing the boot process when the test hash value and the secret key hash value are equal according to the result of the comparison.

22. A secure boot method of a semiconductor memory system including a public key, a hash value generated using a secret key, and boot information generated using the public key and the secret key, the method comprising:
   generating a test secret key by using the secret key hash value and the boot information;
   generating a test hash value by using the test secret key;
   comparing the test hash value and the secret key hash value;
   terminating a boot process when the test hash value and the secret key hash value are not equal according to a result of the comparison; and
   continuing the boot process when the test hash value and the secret key hash value are equal according to the result of the comparison,
   wherein the secret key hash value is a value obtained by hashing the secret key and the boot information is obtained by performing an XOR operation on the secret key and a value obtained by hashing a value obtained by concatenating the public key and the secret key hash value, in units of bits.

23. The method of claim 22, wherein the generating of the test secret key comprises:
   concatenating the public key and the secret key hash value;
   hashing the value obtained through the concatenation; and
   generating the test secret key by performing an XOR operation on a value obtained by hashing the value obtained through the concatenation and the boot information.

24. The method of claim 22, wherein, the test hash value is generated by hashing the test secret key.

25. The method of claim 21, wherein the semiconductor system further comprises a kernel, a kernel digital signature that is a digital signature value of the kernel, a second boot loader verifying integrity of the kernel, a second boot loader digital signature that is a digital signature value of the second boot loader, and a first boot loader verifying integrity of the second boot loader.

26. The method of claim 25, wherein the step of continuing of the boot process comprises:
    verifying the integrity of the second boot loader through the verification of the second boot loader digital signature by using the public key;
    terminating the boot process when the verification of the second boot loader fails; and
    continuing the boot process when the verification of the second boot loader is successful.

27. The method of claim 26, wherein the step of continuing of the boot process when the verification of the second boot loader is successful comprises:
    verifying the integrity of the kernel through the verification of the kernel digital signature by using the public key;
    terminating the boot process when the verification of the kernel fails; and
    executing the kernel when the verification of the kernel is successful.

28. The method of claim 27, wherein the executing of the kernel comprises decoding a part or the overall region of the kernel by using the secret key when the part or the overall region of the kernel is encrypted using the secret key.

29. The method of claim 27, wherein the executing of the kernel comprises:
    generating a second secret key by using the secret key when a part or the overall region of the kernel is encrypted using the second secret key; and
    decoding the part or the overall region of the kernel by using the second secret key.

30. The method of claim 26, wherein the continuing of the boot process when the verification of the second boot loader is successful comprises:
    verifying the integrity of the kernel through the verification of the kernel digital signature by using the second public key when the semiconductor memory system further comprises a second public key used for the verification of the impeccability of the kernel;
    terminating the boot process when the verification of the kernel fails; and
    executing the kernel when the verification of the kernel is successful.

* * * * *